Sept. 22, 1970     A. P. HONCHAR     3,529,933
METHOD FOR TREATING A SOLID PARTICULATE MATERIAL WITH A FLUID
Original Filed June 17, 1966

INVENTOR
Andrew P. Honchar
BY Harold L. Gammons
AGENT

United States Patent Office 3,529,933
Patented Sept. 22, 1970

3,529,933
METHOD FOR TREATING A SOLID PARTICULATE MATERIAL WITH A FLUID
Andrew P. Honchar, Westfield, N.J., assignor to National Lead Company, New York, N.Y., a corporation of New Jersey
Original application June 17, 1966, Ser. No. 558,337. Divided and this application Apr. 2, 1969, Ser. No. 839,108
Int. Cl. C01g 23/04
U.S. Cl. 23—202    3 Claims

ABSTRACT OF THE DISCLOSURE

The instant invention relates in general to a method and apparatus for contacting a fluid with a solid for the purpose of altering the composition of the solid and in particular to a method and apparatus for continuously leaching a metallized titaniferous iron ore with an acid to dissolve and remove the iron values and recover a titanium concentrate suitable for chlorination in the production of $TiCl_4$.

---

This application is a division of U.S. application Ser. No. 558,337, filed June 17, 1966, and now U.S. 3,468,633, issued Sept. 23, 1969.

There are of course, many types of operations involving contact of a granular solid with a fluid, examples of which may be found in the fields of absorption, ion-exchange, crystallization and the like. In these operations both co-current and countercurrent flow of the solid and fluid materials may be found. In those instances in which countercurrent flow has been used, i.e. where the solid particles flow by gravity downwardly against an upwardly flowing fluid, various mechanical devices have been resorted to in order to produce a downward flow of the solids against the uplifting effect of the fluid. These mechanical devices, however, have numerous disadvantages including cost of construction and operation, mechanical wear, breakage, etc.

Other expedients for controlling the solids include the use of a supplementary flow of liquid downwardly, co-currently with the flow of solids or the use of vertical tubes connecting successive treating chambers. Despite the fact that the latter devices have no moving parts they are relatively complex and hence subject to frequent malfunctioning. Moreover, they are relatively inefficient in as much as they permit contamination of partially treated solids with untreated solids; and further, embody no means for controlling the retention time of the solids at any one treating zone independently of the other treating zone.

An object of the present invention is to provide an improved process and apparatus for treating solids with fluids in an efficient, economical and dependable manner.

A further object of the invention is to provide improvements over previously known methods and apparatus for treating solid particulate material with fluid treating agents wherein the solid particulate material is treated in increments and the treatment of each increment is effected independently of every other increment.

Another object of the invention is to provide superior method and means for continuously leaching metallized ilmenite ore with an acid to produce a $TiO_2$ concentrate suitable for chlorination feed material in the production of titanium tetrachloride.

These and other objects, features and advantages of the invention will be described and illustrated in more detail below and by the drawings in which.

Figure 1:
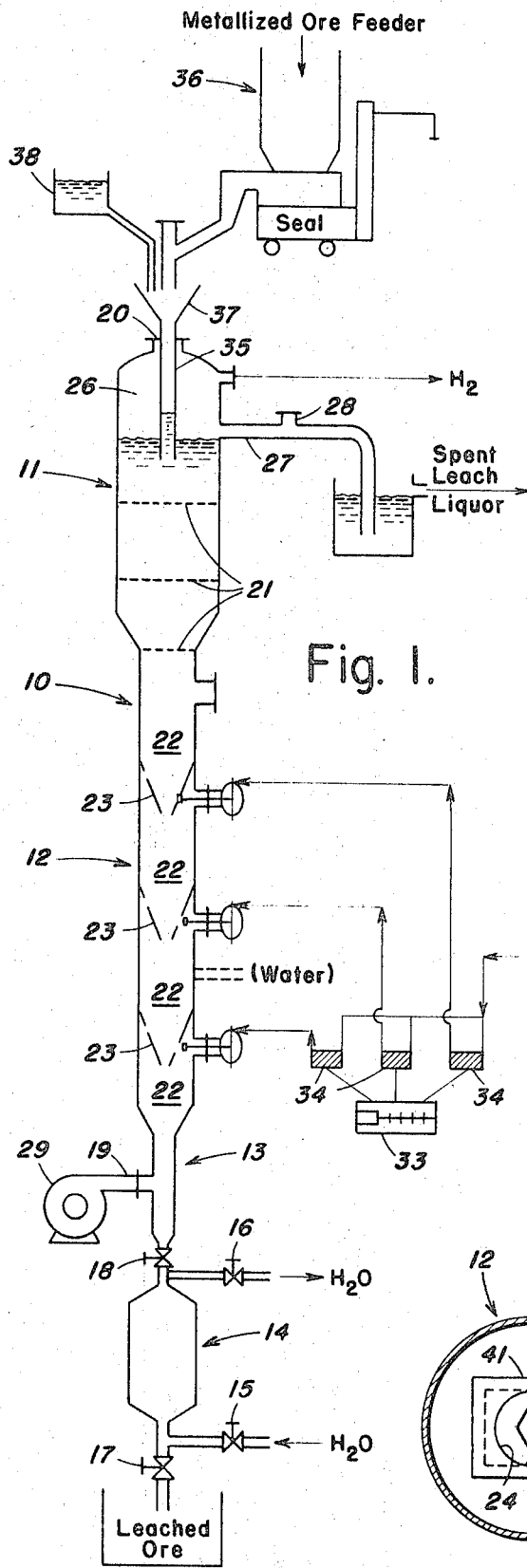
FIG. 1 is a schematic vertical elevation, of apparatus for carrying out the process of this invention showing the treating tower and means for controlling the flow of solids to the several successive treating zones of the tower.

In general the present invention relates to an improved method and apparatus for treating solid particulate materials with a fluid in which the fluid flows in a direction countercurrent to the direction of flow of the solid particulate material by subjecting the particulate material first to a roughing-treatment and then to a finishing-treatment, the finishing-treatment being characterized by passing the particulate material by gravity feed through at least one and preferably a plurality of segregated treating zones in each of which a separate increment of the solid material is subjected to treatment by said fluid, the retention time in each treating zone being independent of that at every other treating zone and controlled by effecting a change in the linear flow velocity of fluid at each treating zone.

As pointed out above among the many applications of the instant invention may be included absorption towers, ion-exchange processes, chlorination techniques ore digestion and the like but for the purpose of illustrating the instant invention the following description relates to a method and means for leaching a metallized titaniferous iron ore with a mineral acid to produce a chlorination feed material suitable for use in the production of $TiCl_4$. It will be understood however that this embodiment of the invention is for illustration purposes only and that the invention contemplates all applications and modifications thereof within the scope of the appended claims.

The method of the instant invention may be described more specifically as comprising the steps of: feeding a solid particulate material i.e. metallized ilmenite ore by gravity feed into the top of an upright leaching tower characterized by a rough-leaching section and a finish-leaching section, the rough-leaching section being at the upper end of the tower; feeding a leach fluid, i.e. sulfuric acid at a constant rate of flow into the lower end of the tower for passage upwardly therein through the finish-leaching section into the rough-leaching section of the tower where the acid attacks the incoming metallized ore and leaches out a major portion of the iron fraction; thereafter allowing the incompletely leached ore to flow by gravity into the finish-leaching section of the tower there to effect removal of the residual iron fraction by providing at least one and preferably a plurality of super-imposed leaching zones in the finishing-section of said tower each leaching zone being characterized by a funnel-shaped shelf having an ever-open outlet; maintaining the linear velocity of the acid flowing upwardly through the ever-open outlets of said shelves, normally, sufficient to retain segregated portions of the incompletely leached ore in fluid or turbulent motion on said shelves for further leaching; selectively reducing the linear velocity of the acid flowing through any one of the ever-open outlets of said shelves, independently of the others, to effect release of the ore from the corresponding shelf for gravity flow downwardly through its ever-open outlet to the next lower shelf for further leaching, and varying the retention time of the ore at each leaching zone by varying the length of time the acid flows upwardly at its normal linear velocity through the ever-open outlet of the corresponding shelf.

The process of this invention is designed especially for leaching a metallized ore continuously, the leached ore being discharged continuously or intermittently, from the lower end of the tower after passing through a washing zone; and the spent acid being discharged continuously from the upper end of the tower. In this particular application of the invention wherein a metallized ilmenite ore is leached with sulfuric acid, hydrogen gas is evolved and rises up through the tower into a gas chamber provided above the rough-leaching section of the tower there to escape by way of a suitable exhaust port. Since it is important that the collection and removal of the hydrogen gas be carefully controlled and that none escapes from the gas chamber into the atmosphere the process of this invention also includes feeding the metallized ore into the upper end of the leaching tower through a liquid-seal which is maintained within the gas chamber to preclude the escape of the hydrogen gas to the atmosphere.

Referring now to the drawings, the apparatus embodies, in general, a leaching tower into which the metallized ore is fed for leaching; equipment for feeding the metallized ore and the leaching acid to the tower; means for washing the leached ore before being discharged from the tower; and means for recovering the spent acid and any gases generated during leaching. The leaching tower, which is designated generally at 10, is a sealed unit made of a corrosion resistant material such as a suitable ceramic, Pyrex glass, silica or suitable alloy metals. The tower is preferably although not necessarily substantially cylindrical, having an enlargement 11 at its upper end which identifies the rough-leaching section of the tower, the portion of the tower below the rough-leaching section being somewhat smaller diameter and identified with the finish-leaching section 12 of the tower. The lower end of the finish-leaching section 12 comprises a pipe-section 13 of relatively small diameter below which is a washing-section 14 of larger diameter having a lateral water-inlet pipe with valve 15, a water-outlet pipe with valve 16, and a discharge-pipe with valve 17. The water-inlet and outlet pipes are used to circulate water through the washing-section 14 for subjecting leached ore therein to a washing treatment before being discharged from the washing-section. A valve 18 is provided at the lower extremity of the pipe-section 13 for shutting off this section from the washing-section 14; also an inlet pipe 19 is provided in the pipe-section 13 for introducing the leaching acid into the lower end of the leaching tower. As mentioned above, the tower is adapted to be sealed from the atmosphere and to this end is provided with a cover 20 at its upper end. Also the several valves of the tower are made gas-tight.

Reverting again to the rough-leaching section 11 of the tower, here the metallized ore is first brought into contact with the leach acid and inasmuch as the amount of metallic iron in the reduced ore is maximum the reaction of the acid with the iron is extremely rapid and hence is accompanied by the generation of large volumes of hydrogen gas which creates severe turbulence of the ore-acid mixture. To afford some measure of control of the ore-acid mixture during this rough-leaching step a plurality of perforated plates 21 are provided in this section of the tower to act as baffles for damping the severe agitation of the ore-acid mixture.

As mentioned above the finish-leaching section 12 of the tower is divided into a plurality of super-imposed leaching zones 22 each being characterized by a funnel-shaped shelf 23 formed of a corrosion resistant material such as antimony lead.

Figure 2:
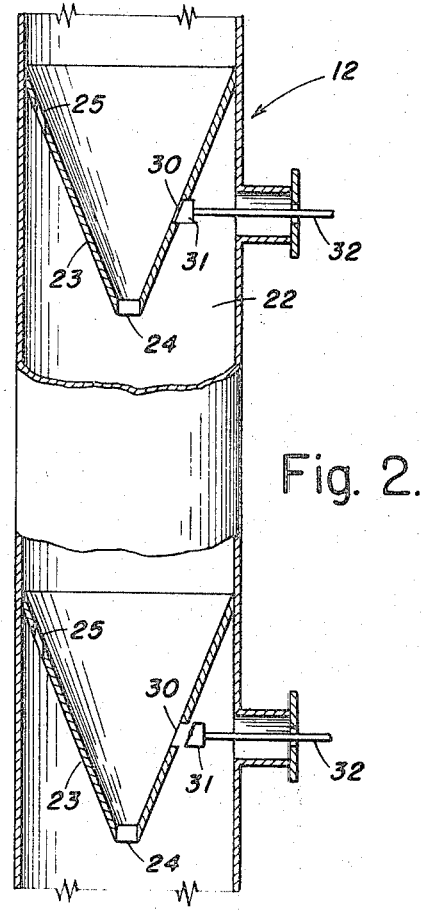
FIG. 2 is an enlarged side elevation partly in section of two of the funnel-shaped shelves in successive treating zones of the leaching tower.

As shown especially well in FIG. 2 each funnel-shaped shelf has an ever-open outlet 24 at its apex for discharging ore therefrom to the next lower shelf as hereinafter described. Each funnel-shaped shelf 23 is also provided with a small aperture or weep-hole 25 in its wall adjacent the intersection thereof with the wall of the tower to permit the hydrogen gas evolved during leaching of the ore to pass upwardly in the tower through the successive leaching zones 22 into a gas chamber 26 provided in the enlarged rough-leaching section 11 of the tower above the level of the acid therein. In this connection a lateral discharge pipe 27 is provided in the gas chamber 26 to permit the discharge of the hydrogen gas and spent acid from the tower, the spent acid and the hydrogen gas being separated by a T-connection 28 at the outer end of the discharge pipe 27.

As pointed out above an inlet pipe 19 is provided for feeding the leach acid into the lower end of the tower for passage upwardly therein and to this end a pump 29, or its equivalent, is provided for pumping the acid at a uniform rate of flow into the tower. Consistent with the objects of the instant invention, the rate of flow of the acid into the tower, in liters/min., is related to the diameters of the ever-open outlets of the funnel-shaped shelves in the finish-leaching section of the tower such that, normally, the linear velocity of the acid flowing up through the ever-open outlets of the shelves is sufficient to prevent the ore on the shelves from flowing downwardly therethrough. Moreover the linear velocity of the acid may be such as to actually create turbulence of the ore on or above the shelves thereby effecting a more efficient leaching action.

Referring again to FIG. 2 that latter shows one embodiment of the means used for initiating flow of the ore downwardly through the ever-open outlets of the funnel-shaped shelves against the upwardly flowing acid. In this embodiment each funnel-shaped shelf is provided with a valved-aperture 30, formed about midway up the wall of the shelf, having a valve 31 and valve actuating means 32. Each valve actuating means 32 comprises a rod extending laterally through an apertured T in the wall of the tower and is adapted to be operated either manually or automatically to move its valve 31 to and from its corresponding aperture 30 to close or open the latter. In the case where the actuating means 32 is operated automatically it is connected into suitable circuitry including timer 33 and electrically or pneumatically actuated solenoids indicated generally at 34 for operating each valve 31 in timed sequence.

Normally the valved apertures 30 of the funnel-shaped shelves are held closed by the corresponding actuating means 32 and under these circumstances the linear velocity of the acid flowing upwardly through the ever-open outlets of the shelves is sufficient to prevent the ore thereon from flowing down through the ever-open outlets to the next lower shelves. However when any one of the valves 31 is opened acid will flow upwardly through its aperture 30 as a consequence of which the linear velocity of the acid flowing up through the ever-open outlet 24 of the corresponding shelf is lowered thus permitting the ore thereon to flow down therethrough. It will be evident from the drawing that each funnel-shaped shelf is provided with its own valved-aperture 30 and control means therefore and hence it follows that the retention of the ore on each shelf is independent both in sequence of operation and time from that of any other shelf.

As mentioned above, the metallized ore is adapted to be fed into the top of the leaching tower by way of a liquid-seal to prevent the escape of hydrogen gas from the tower. To this end an ore feed tube 35 is arranged to extend through the cover 20 of the tower with a gas tight seal down into the gas chamber 26 to a point therein below the level of the sulfuric acid in the rough-leaching section 11 of the tower. Due to a difference between the hydrostatic pressure in the gas chamber 26 and in the ore feed tube 35 the sulfuric acid will rise up into the ore feed tube above the level of the acid in the gas chamber thus forming a liquid seal in the feed tube 35 which permits the metallized ore to be fed continuously into the upper end of the leaching tower while excluding the escape of hydrogen gas therefrom. Any suitable means may be used for feeding the metallized ore into the feed tube 35. Preferably the ore feeder which is indicated schematically at 36, should be capable of measuring the ore feed rate. Moreover experience has shown that a uniform flow of ore into the feed tube is assured by providing a funnel 37 at the upper end of the feed tube and maintaining a spray of water and/or dilute acid therein from spray head 38 to prevent the ore from bridging and to continuously flush it down into the feed tube.

The operation of the leaching column may be described briefly as follows:

Prior to feeding the metallized ore to the leaching tower the valve 18 at the lower end of the finish-leaching section is closed shutting it off from the washing zone 14, and pump 29 is started to pump dilute sulphuric acid at a uniform rate into the bottom of the tower filling it up to the level of the discharge pipe 27 at which time some of the dilute acid rises up in the lower end of the ore feed tube 35 to form the aforementioned liquid-seal. Metallized ore together with water from the spray head 38 is now fed by way of the feed tube 35 into the rough-leaching section 11 of the tower where a relatively violent leaching action takes place accompanied by the dissolution of a major portion of the metallic iron in the ore. The violence of this reaction sends the ore particles down through the perforated plates 21 into the finish-leaching section 12 of the tower. At the outset the valved-apertures 30 of the shelves 23 are closed and hence, as explained above, the linear velocity of the acid flowing up through the ever-open outlets 24 of the shelves is such that the metallized ore flowing down from the rough-leaching section into the top side of the uppermost funnel-shaped shelf is held from passing down through its ever-open outlet 24. Following a predetermined interval during which an appreciable amount of metallized ore is accumulated on the topmost shelf, its valved-aperture 30 is opened by actuation of its valve operating rod 32 as a consequence of which the linear velocity of the acid flowing up through the ever-open outlet 24 is decreased thereby allowing the ore to flow by gravity feed therethrough to the next lower shelf. If the valved aperture 30 of the next lower shelf is closed, then the partially leached ore from the upper shelf will be retained thereon until such times as its valved aperture 30 is opened whereupon the leached ore will flow by gravity down to the next lower shelf. Thus an increment of incompletely leached ore moves continuously, by jerks, or intervals, from the topmost shelf of the finish-leaching section of the tower to the bottom thereof; and at each self or leaching zone the ore increment may be retained for a predetermined length of time independently of the ore increment at other shelf levels, and without being contaminated by fresh or partially leached ore from the leaching zone above.

As the leached ore passes through the ever-open outlet 24 of the lowermost shelf it accumulates in the pipe-section 13 of the tower where it is subjected to additional leaching by the acid therein; and in this connection it will be observed that at this point in the tower the acid concentration is strongest and hence is especially effective in leaching the last traces of metallic iron from the ore.

During the operation of the leaching tower the reaction of the acid with the metallic iron in the ore creates hydrogen gas and this rises up continuously through the leaching tower from one leaching zone to the next through the weep-holes 25 provided in each shelf and collects in the gas chamber 26 from which it escapes together with the spent acid via the discharge pipe 27.

Pursuant to further objects of the invention the fully leached ore is washed before being discharged from the tower. To this end the discharge valve 17 of the washing-section 14 is closed and the water-inlet valve 15 and outlet valve 16 are opened to permit water to circulate through the washing section 14 whereupon the valve 18 of the pipe-section 13 is opened to permit the fully leached ore to flow down into the washing-section 14. The valve 18 is then closed and after a selected time interval during which the leached ore is thoroughly washed the water inlet valve 15 is closed and the discharge valve 17 is opened to allow the washed fully leached ore to be discharged from the tower. By using this system of valves and sequence of operations each batch of fully leached ore may be thoroughly washed without interrupting the flow of acid into the lower end of the finish-leaching section of the tower.

Figure 3:
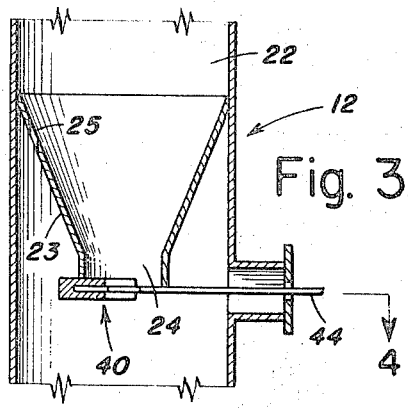
FIG. 3 is an enlarged schematic elevation partly in section, of a modified fluid flow control device for use with the funnel-shaped shelves of the tower.
Figure 4:
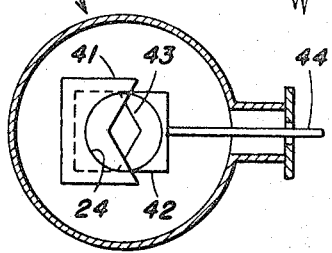
FIG. 4 is a transverse section on line 4—4 of FIG. 3 showing details of the modified fluid flow control device.

Referring again to the drawings, FIGS. 3 and 4 show a modification of the means used for initiating the flow of ore downwardly through the finish-leaching section against the upwardly flowing acid. In this embodiment of the invention each shelf is provided with an ever-open outlet 24; and mounted immediately below and in contact therewith is a shutter 40. As shown especially well in FIG. 4 the latter is of conventional design comprising a fixed plate 41 and movable plate 42 said plates having V-shaped notches in opposed edges for defining an aperture 43. The movable plate 42 is provided with an operating rod 44, corresponding to the valve operating rods 32 shown in FIG. 2, to vary the size of the aperture 43 and hence the effective size of the ever-open outlet of each shelf for effecting an increase or decrease in the linear velocity of the acid flowing upwardly therethrough.

As mentioned at the outset the tower is sealed from the atmosphere and hence may be operated at atmospheric pressures or at pressures above atmospheric the latter being conductive of higher dissolution of leachables and superior $TiO_2$ concentrates.

The following examples will serve to further illustrate the method and apparatus of this invention as used for the production of a $TiO_2$ concentrate from a metallized ilmenite ore.

EXAMPLE I

The leaching tower which, for purposes of illustrating the invention was approximately 13 ft. high about 6 inches in diameter at its rough-finishing section and about 3 inches in diameter through its finish-leaching section, was first purged with nitrogen gas to displace any entrained air in the system. Valve 18 being closed, acid pump 29 was started to feed dilute sulfuric acid (12% $H_2SO_4$) at 70° C. via feed pipe 19 into the bottom of the tower at a uniform rate of approximately 483.0 ml. per minute. The metallized ore to be used was a magnetic fraction produced by heating an ilmenite ore in the presence of a reductant and passing the reduced ore through a magnetic separator to effect separation of the non-magnetic gangue material. The gangue-free magnetic material had the following analysis:

TABLE I

Analysis of gangue-free magnetic fraction of metallized ore

|  | Percent |
|---|---|
| $TiO_2$ | 55.3 |
| Fe (total) | 40.3 |
| Fe (metallic) | 38.7 |
| Metallization | 96.0 |

390 lbs. of this metallized ore were fed from the feeder 36 into the leaching tower at the rate of 19.1 lbs. per hour and simultaneously the water spray head 38 was started to feed water into the funnel 37 of the ore feed tube 35 at the rate of 1,400 ml. per minute.

The leaching zones in the finish-leaching section of the tower consisted of three equally spaced superimposed funnel-shaped shelves the walls of which made an angle of about 86° with the horizontal and the ever-open outlets of which were 7/16" in diameter.

With the acid being pumped into the tower at a uniform rate of 483.0 ml. per min. the linear velocity of the leaching acid upwardly through the ever-open outlets of the several shelves was 0.52 ft./sec. At this linear velocity the metallized ore was retained in a fluidized state on each shelf.

At start-up the metallized ore was fed into the rough-leaching section 11 of the tower where it was retained for 20 minutes after which the timer 33 was started to effect the sequential transfer of the incompletely leached ore downwardly by gravity feed into the finish-leaching section of the tower. The timer was set so that the total elapsed leaching time for each increment of metallized ore from one leaching zone or shelf to the next was 10 minutes of which 4 minutes was drop time.

Both the valve 17 and the valve 18 were closed at start-up and after a period of about 35 minutes, corresponding to the total retention time of a given increment of ore in the leaching tower, water-inlet and outlet valves 15 and 16 were opened to circulate water through the washing-section 14. Valve 18 was then opened to permit the fully leached ore to flow down into the washing-section 14 whereupon the valve 18 was closed and the ore was retained in the washing-section for about 60 minutes for thorough washing after which water inlet valve 15 was closed and outlet valve 17 was opened thereby discharging the fully leached, washed concentrate from the tower.

The residual leach liquor in the concentrate was removed by further washing and filtration and the resulting $TiO_2$ concentrate was then dried by heating to 375° F. for about 12 hours.

At this point it may be mentioned that materials suitable for use as chlorination feed in the production of titanium tetrachloride are those which contain high amounts of $TiO_2$ and low amounts of other chlorinatables and in particular iron, an ideal chlorination feed material being an unground rutile ore concentrate comprising at least 90.0% $TiO_2$, and from 0.5 to 2.0% iron and having a particle size range of from —40 to +150 mesh by Standard Tyler screens.

An analysis was made of the $TiO_2$ concentrate produced as hereinabove described and showed 92.2% $TiO_2$ and 1.4% total iron. Moreover there was no significant diminution in particle size during leaching and hence the concentrate was suitable for use as a chlorination feed material for the production of $TiCl_4$.

EXAMPLES II–V

Several additional runs were made using a metallized ore of the type described in Example I but under somewhat different operating conditions. These operating conditions are tabulated in Table II below, together with the analyses of the $TiO_2$ concentrates produced.

TABLE II.—LEACH COLUMN OPERATING DATA

| Examples | I | II | III | IV |
|---|---|---|---|---|
| Ore charge (lbs.) | 390.0 | 518.0 | 669.0 | 536.0 |
| Ore feed rate (lbs. per hour) | 19.1 | 15.0 | 15.0 | 15.0 |
| $H_2SO_4$ (feed rate ml/min.) | 483.0 | 440.0 | 444.0 | 440.0 |
| $H_2O$ to ore feed (ml/min.) | 1,400.0 | 1,308.0 | 1,358.0 | 1,440.0 |
| Ore: retention time in column (min.) | 35.0 | 35.0 | 35.0 | 35.0 |
| $H_2SB_4$ linear velocity in conical apex (ft./sec.) | 0.52 | 0.43 | 0.43 | 0.45 |
| Temp. ($H_2SO_4$° C.) | 70.0 | 66.0 | 65.0 | 74.0 |
| Total running time (hrs.) | 20.0 | 34.0 | 40.0 | 35.0 |
| Concentrate: | | | | |
| Total titanium as $TiO_2$, percent | 92.2 | 92.3 | 92.5 | 92.9 |
| Total iron oxides as Fe(t), percent | 1.4 | 1.7 | 1.5 | 1.2 |

From the foregoing description and examples it is evident that the leaching column of the instant invention provides an efficient, dependable and relatively inexpensive method for treating a solid particulate material with a fluid; and in particular for leaching a metallized ilmenite ore with an acid to produce a $TiO_2$ concentrate suitable for use as feed material in the production of $TiCl_4$. While the leaching may be done as a batch type operation the preferred operation is a continuous one wherein the metallized ore if fed continuously into the top of the leaching column and the washed $TiO_2$ concentrate is discharged continuously, or intermittently, from the bottom thereof.

The invention may be carried out in other specific ways than those herein set forth without departing from the spirit and essential characteristics of the invention; and the present embodiments are therefore to be considered in all respects as illustrative and not restrictive, and all changes coming within the meaning and equivalency range of the appended claims are intended to be embraced therein.

What is claimed is:

1. Method for leaching a gangue-free metallized titaniferous ore, said metallized portion principally consisting of elemental iron, with dilute sulfuric acid solution by fluid-solid contact to selectively dissolve and remove the iron values and recover a titanium dioxide concentrate, comprising the steps of:
   (a) feeding said metallized ore initially to a rough-leaching zone and then to a plurality of superimposed finish-leaching zones having ever-open outlets;
   (b) feeding said dilute sulfuric acid solution continuously and at a uniform rate of flow upwardly through said superimposed finish-leaching zones in a direction countercurrent to the gravity feed of said metallized ore to fluidize and leach said ore, the leaching of said ore being accompanied by the evolution of hydrogen gas;
   (c) maintaining the linear velocity of said acid upwardly through the ever-open outlets of said finish-leaching zones sufficient to retain segregated portions of said metallized ore at said finish-leaching zones;
   (d) reducing the linear velocity of said acid through the ever-open outlets of any one finish-leaching zone sufficiently to release the corresponding segregated portion of said metallized ore for gravity flow to the next lower finish-leaching zones;
   (e) bleeding said hydrogen gas from the finish-leaching zones upwardly into the rough-leaching zone;
   (f) discharging the leached ore from the lowermost finish-leaching zone;
   (g) discharging the spent acid from the rough-leaching zone;
   (h) and maintaining a liquid seal between the acid being discharged from the rough-leaching zone and the metallized ore being fed thereto.

2. Method according to claim 1 wherein the liquid seal between the acid and the metallized ore is maintained by supporting a column of liquid in the rough-leaching zone and feeding the metallized ore thereto through said column of liquid.

3. Method according to claim 1 wherein a washing zone is maintained below the lowermost finish-leaching zone and the leached ore discharged therefrom is fed to said washing zone and washed.

References Cited

UNITED STATES PATENTS

| 3,018,170 | 1/1962 | Soloducha | 23—202 XR |
| 3,416,885 | 12/1968 | Honchar | 23—202 XR |
| 3,428,427 | 2/1969 | Raiceric | 23—102 |
| 3,468,633 | 9/1969 | Honchar | 23—310 XR |

EDWARD STERN, Primary Examiner

U.S. Cl. X.R.

23—1; 75—1, 101